United States Patent
Doval et al.

(10) Patent No.: US 6,505,910 B1
(45) Date of Patent: Jan. 14, 2003

(54) INKJET PRINTER INK-OUT SENSING DURING PRINTING

(75) Inventors: Jose J. Doval, Escondido, CA (US); Anton Tabar, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/929,778

(22) Filed: Aug. 14, 2001

(51) Int. Cl.[7] .................................................. B41J 2/01
(52) U.S. Cl. ........................................................ 347/19
(58) Field of Search ........................ 347/7, 19; 399/27

(56) References Cited

U.S. PATENT DOCUMENTS

| | | |
|---|---|---|
| 5,680,521 A | * 10/1997 | Pardo et al. ............... 358/1.13 |
| 5,699,090 A | 12/1997 | Wade et al. |
| 5,731,824 A | 3/1998 | Kneezel et al. |
| 5,844,580 A | 12/1998 | Barinaga et al. |
| 6,145,947 A | * 11/2000 | Inora et al. .................... 347/7 |
| 6,179,401 B1 | 6/2001 | Stephens, Jr. et al. |

FOREIGN PATENT DOCUMENTS

EP 0 779 156 6/1997

* cited by examiner

Primary Examiner—Craig Hallacher

(57) ABSTRACT

Sensing when an inkjet printer is out of ink during printing is disclosed. Buffer color information for a swath to be printed next on a sheet by the printer is evaluated. The printed color information for the swath is then measure as the swath is printed on the sheet. If the printer color information is less than substantially equal to the buffer color information, one or more out-of-ink actions, such as notifying the user and/or aborting printing, are performed. A printer performing such sensing is also disclosed.

20 Claims, 5 Drawing Sheets

INKJET PRINTER INK-OUT SENSING DURING PRINTING

FIELD OF THE INVENTION

This invention relates generally to inkjet printers, and more particularly to sensing when the ink has run out of one or more of the inkjet cartridges of such printers.

BACKGROUND OF THE INVENTION

Inkjet printers have become increasingly inexpensive and increasingly popular, especially for home computer users. A typical inkjet printer usually has a number of common components, regardless of its brand, speed, and so on. There is a print head that contains a series of nozzles used to spray drops of ink onto paper. Ink cartridges, either integrated into the print head or separate therefrom, supply the ink. There may be separate black and color cartridges, color and black in a single cartridge, a cartridge for each ink color, or a combination of different colored inks in a given cartridge. A print head motor typically moves the print head assembly back and forth horizontally, or laterally, across the paper, where a belt or cable is used to attach the assembly to the motor. Other types of printer technologies use either a drum that spins the paper around, or mechanisms that move the paper rather than the print head. The result is the same, in that the print head is effectively swept across the paper linearly to deposit ink on the paper. Rollers pull paper from a tray, feeder, or the user's manual input, and advance the paper to new vertical locations on the paper.

Inkjet printers have advanced to the point where they can now be used to print high-quality prints from photographic images taken by digital cameras, scanned in from conventional prints, or synthetically generated images, such as animated images. Since digital cameras have also become increasingly inexpensive and popular, many users opt to take digital pictures and print them on inkjet printers, instead of taking pictures on regular film and having them professionally developed. With commonly available computer software, users have the ability to crop, remove redeye, and perform other modifications to the pictures prior to printing them on their printers. The combination of a digital camera and an inkjet printer allows a home user to have significantly more control over the photographic printing process than if the user were to take pictures with a regular camera and have them professionally developed.

A downside to printing photographic images and other high-quality color images and documents on an inkjet printer, however, is that both replacement ink cartridges and the special inkjet paper used to obtain optimal prints can be expensive. Many users may opt to print draft-quality images on less-expensive or non-inkjet paper before printing their final prints. Furthermore, most affordable inkjet printers print quite slowly at their highest-quality settings. When a user wants to print thirty, forty, or more standard-size four inch-by-six inch prints on such an inkjet printer, he or she is likely to start the print job before going to sleep at night or going to work in the morning. When the user wakes up or comes home from work, the job will by then have finished. This technology has also been extended to fax printing, or any printing that is either unattended, such as faxes are, or takes a long time to print, such as printing photos, or printing large-format computer-aided design (CAD) drawings.

A difficulty with this approach, however, is that one or more of the color or black inks may run out while the printer is printing. In a best-case scenario, the printer may detect the ink running out, and abort printing to avoid wasting expensive inkjet paper. If the printer were to continue printing, paper would be wasted because typically only one of the commonly found three, four, or six ink cartridges runs out of ink. Therefore, ink is still deposited on the paper, but not in the right color combinations according to the image being printed. In a worst-case scenario, the inkjet printer may not detect the ink running out until many sheets of the expensive inkjet paper have been ruined, at potentially considerable cost and frustration to the user. This may occur even if the printer is equipped with an ink-out sensing capability, especially for printers having foam ink cartridges.

Foam ink cartridges have foam within the cartridge to store the ink. The foam generally enables the inkjet printer to print more refined and smaller droplets of ink than non-foam ink cartridges, as well as providing other advantages. However, a disadvantage to using foam is that ink tends to pool in the lowest section of the foam, especially during inter-sheet delays. Inter-sheet delays result from the already printed sheet being ejected out of the printer, a new sheet being fed into the printer, and inkjet print head calibration and other processes being performed prior to the printer printing on the new sheet. Printers equipped with ink-out sensing capability typically check for a low- or no-ink condition just prior to a new sheet being printed, after the inter-sheet delays have been incurred. However, because the ink collects in the lowest section of the foam in the cartridge, this verification will erroneously pass, indicating that there is ink in the cartridge, when in fact there is not sufficient ink to print a complete image on the new sheet that has been fed into the printer.

FIG. 1 depicts in a diagrammatical manner this overall process 100 according to the prior art. A number of sheets 102A, 102B, . . . , 102N are to be printed on by the inkjet printer. Ink checks 104A, 104B, . . . , 104N are performed before the printer begins printing on the corresponding sheets 102A, 102B, . . . , 102N. There may be sufficient ink in the ink cartridges to print the first sheet 102A. Therefore, the ink check 104A yields an OK status, and the sheet 102A prints acceptably. However, by the end of the printing of the sheet 102A, the ink stored in one of the ink cartridges may have sufficiently depleted so that printing the second sheet 102B results in a ruined, unacceptable image. The ink check 104B still yields an OK status, because there is still ink in this cartridge.

For subsequent sheets, such as the sheet 102N, the ink checks, such as the ink check 104N, should yield a rejected status, indicating that the ink has run out or is otherwise very low, such that images are not printed on these sheets, and printing aborts. However, because ink pools in the bottom of the foam of the cartridges, the ink check still yields an OK status, even though the ink has essentially run out. The printer thus still prints on the sheet 102N, because the ink check 104N yields an OK status, even though there is insufficient ink in one of the cartridges. Rather than only one expensive sheet being ruined, the sheet 102B, the sheets through the sheet 102N are also ruined, due to the inability of the inkjet printer to recognize that ink is pooling in the bottom of the foam of the cartridge during inter-sheet delays. If the user is not monitoring the progress of the print job, as is typically the case where a large number of sheets are being printed, this causes a large number of sheets to be ruined.

For these and other reasons, therefore, there is a need for the present invention.

SUMMARY OF THE INVENTION

The invention relates to sensing out-of-ink conditions for an inkjet printer while the printer is printing. A method of the invention includes performing the following at least once during printing on a sheet by an inkjet printer. First, the buffer color information for a swath to be printed next on the sheet by the printer is evaluated. The printed color information for the swath is then measured as the swath is printed on the sheet. If the printer color information is less than substantially equal to the buffer color information, one or more out-of-ink actions, such as notifying the user, aborting printing, and so on, are performed.

A printer of the invention includes one or more sources of ink, an inkjet print head, a swath buffer, a sensor, and an out-of-ink mechanism. The print head prints ink from the sources of ink onto a sheet of paper. The buffer stores buffer color information for a swath to be printed next on the sheet by the print head. The sensor determines printed color information for the swath as printed on the sheet. The mechanism performs one or more out-of-ink actions in response to determining that the printed color information is less than substantially equal to the buffer color information.

A computer-readable medium of the invention has instructions stored thereon for execution by a processor to perform a method. The method includes performing the following at least once during printing on a sheet by an inkjet printer. First, a buffer amount of each ink color to be printed next on the sheet is determined, as well as the actual amount of each ink color printed. If the actual amount of any ink color printed on the sheet is less than substantially equal to the buffer amount of the ink color, one or more out-of-ink actions are performed.

Embodiments of the invention provide for advantages over the prior art. The comparison of buffer color information to printed color information can be performed periodically or even continuously while the inkjet printer is printing. This means that an ink-out condition is likely to be nearly immediately detected, such that printing can be aborted without ruining any sheets other than the current sheet. Ink is also saved, since the printing does not continue, which is especially significant in multi-cartridge printers. Because the ink level is checked while the printer is printing, the ink does not have a chance to collect at the bottom of the foam in the cartridge, so that erroneous acceptable ink-level checks are avoided. Still other advantages, embodiments, and aspects of the invention will become apparent by reading the detailed description that follows, and by referring to the accompanying drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Ink-Out Verification

Figure 1:
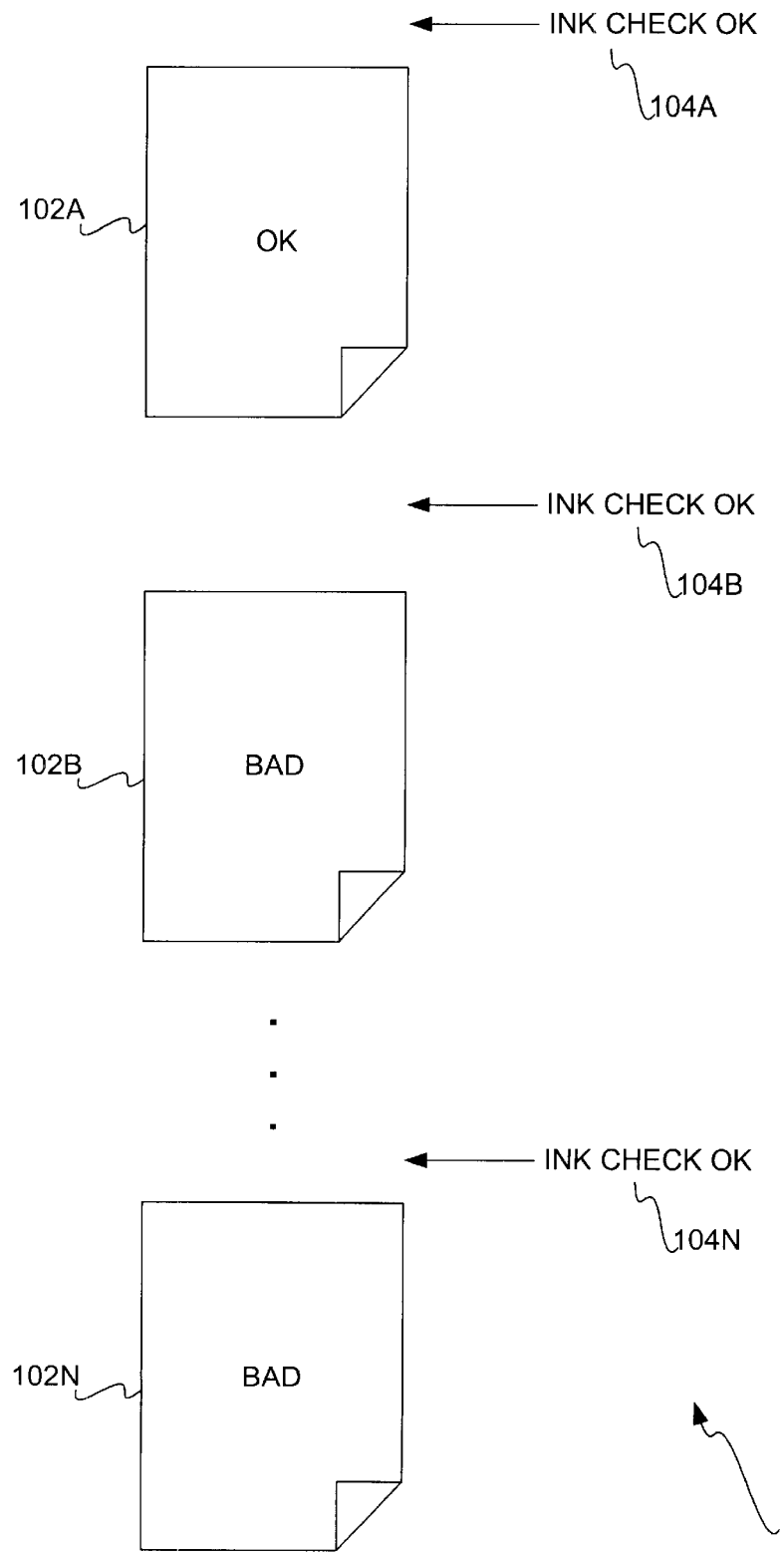
FIG. 1 is a diagram showing the ink-out verification process according to the prior art.
Figure 2:
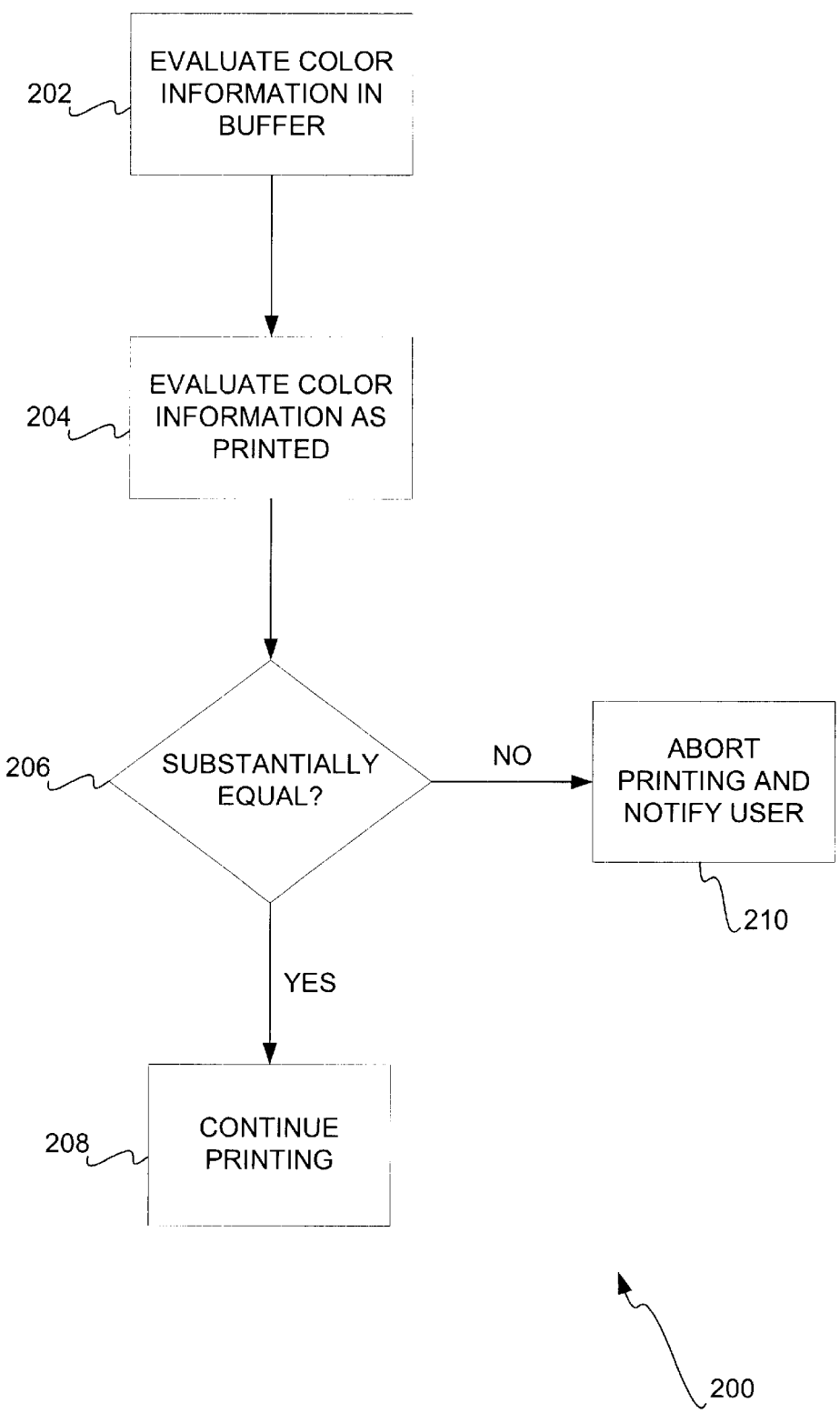
FIG. 2 is a flowchart of a method according to an embodiment of the invention.

FIG. 2 shows a method 200 outlining how an embodiment of the invention performs ink-out sensing during printing by an inkjet printer. The method 200 is performed at least once while the inkjet printer is printing an image onto a sheet of paper. More specifically, the method 200 is performed for at least one or more of the swaths printed on the sheet of paper. A swath is generally defined as one pass of the print head of the printer for a given length. Typically, this length extends from the left end of the current part of the image being printed to the right end of the current part of the image being printed. For instance, for a typical line of text printed from a left margin of one inch to a right margin of one inch, the swath extends from the left margin to the right margin, assuming full justification of the line of text.

Buffer color information in the swath buffer is first evaluated (202). The swath buffer is the memory or other computer-readable medium, typically of the inkjet printer, in which a swath's worth of image information is stored prior to printing on the sheet. The color information can be evaluated for the swath as a whole, or for one or more given parts of the swath. The color information refers to the amount of ink that will be, or more specifically should be, deposited by the printer on the sheet when printing the swath. That is, the color information refers to the amount or concentration of each ink color that will be printed next on the sheet by the inkjet printer, or can be used to infer the amount of ink that is to be used in the swath. This amount of ink is referred to as the buffer amount of ink.

The swath is then printed on the sheet, while the actual color information printed is measured or evaluated (204). The actual color information is the actual amount of ink deposited by the printer on the sheet while printing the swath, or where the actual amount of ink is inferred from the actual color information, as compared to the amount of ink that should be printed based on the color information in the swath buffer. More specifically, the actual color information refers to the amount, or concentration, of each ink color that has been printed as the most recent swath on the sheet by the inkjet printer. A carriage sensor can be used to measure the actual color information.

Generally, the actual amount of ink will be substantially equal to the buffer amount of ink. However, where any one or more of the ink colors for the printer are running low, or have been depleted, the amounts will not be substantially equal. Rather, the actual amount of ink will be less than substantially equal to the buffer amount of ink predicted to be printed. The difference between the actual color information and the buffer color information can be referred to as the color variation for the current swath.

If the actual color information printed is substantially equal to the buffer color information (206), then the method 200 continues printing the next swath on the next line of the sheet (208). However, if the actual color information printed is less than substantially equal to the buffer color information (206), such as by absolutely more than a predetermined threshold, then the method 200 performs one or more out-of-ink actions (210). Such out-of-ink actions preferably include aborting printing, and notifying the user that the printer has run out of one or more of the ink colors, where black can be considered a color as well.

Out-of-ink sensing according is thus performed while an actual image is being printed by the printer on the sheet of paper, where an image can include a text, graphics, images, or any combination thereof, although preferably includes more non-textual subject matter than textual subject matter. Ink does not, therefore, have an opportunity to collect at the bottom of the foam, where the printer uses foam-type cartridges. The sensing of this embodiment of the invention is thus more accurate than that of the prior art.

The method 200 of FIG. 2 can be integrated with more conventional ink checks and other inkjet printer processes, as well as other raster printing processes. For instance, ink checks according to this embodiment of the invention can be performed in conjunction with more conventional intersheet ink checks. The ink supplies may be initialized prior to printing, such that the ink colors are calibrated and otherwise balanced. Furthermore, the method 200 can be performed by the execution of instructions stored on a computer-readable medium, such as a memory, by a processor. The medium and/or the processor may be a part of the inkjet printer itself, or may be a part of a computer that is communicatively connected to the inkjet printer. In other words, either the printer or the computer may perform the method 200.

Figure 3:
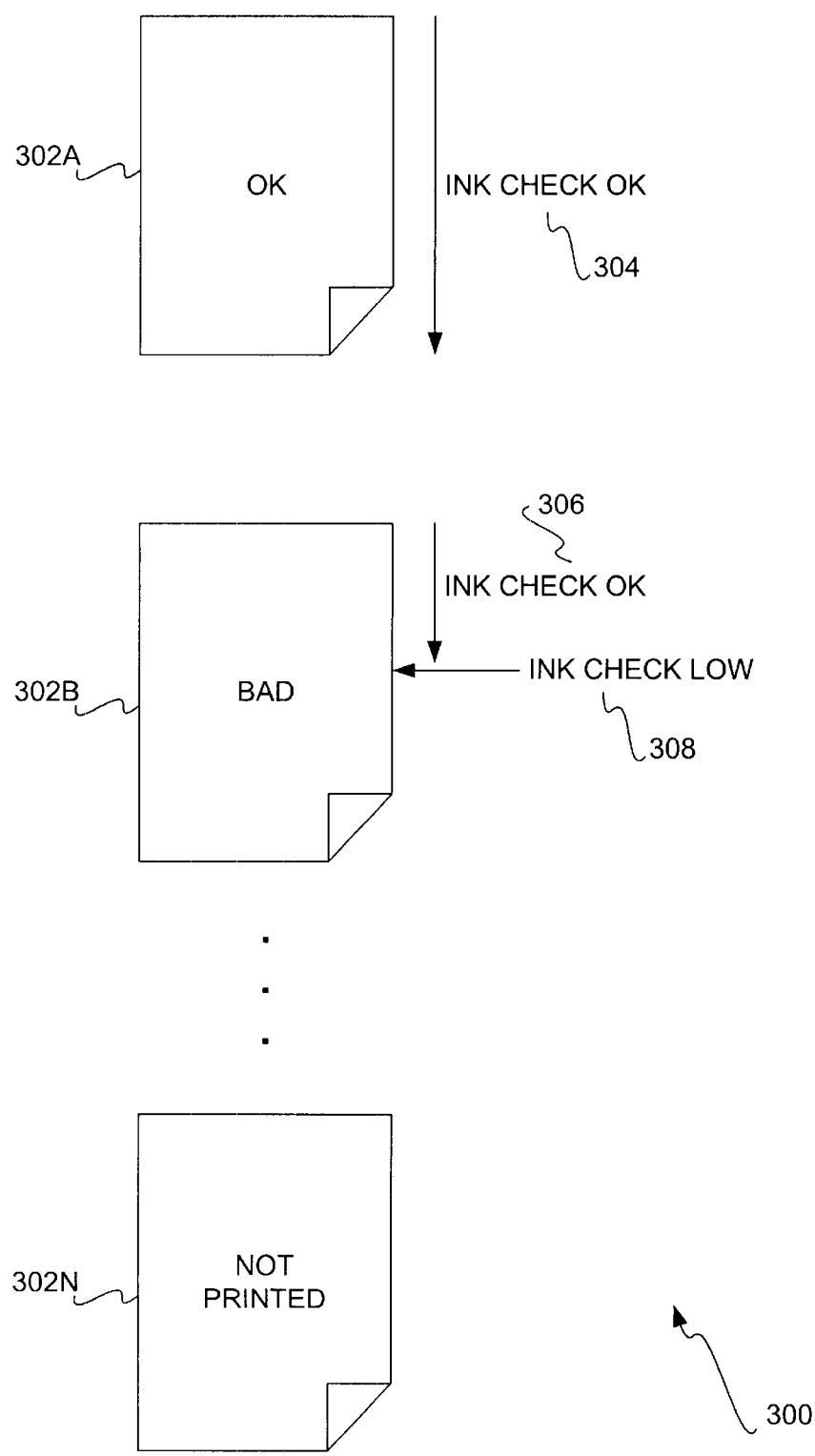
FIG. 3 is a diagram showing the ink-out verification process according to an embodiment of the invention.

FIG. 3 depicts in a diagrammatical manner the overall process 300 according to the embodiment of the invention outlined as the method 200. A number of sheets 302A, 302B, . . . , 302N are to be printed on by the inkjet printer. Ink checks are performed while each sheet is being printed on by the printer. For instance, while the sheet 302A is being printed on, one or more ink checks, as indicated by the ink check 304, are performed. Assuming that none of the ink colors have run out, this check yields an OK status, such that the sheet 302A is printed acceptably. For the first part of the sheet 302B, one or more ink checks are run, as indicated by the ink check 306, that also yield an OK status.

However, at about the middle of the sheet 302B, one or more of the ink colors run out. The ink check 308 yields an out-of-ink status, and the out-of-ink actions are performed. Specifically, printing stops, and the user is notified. While the sheet 302B may be ruined, because printing has been aborted, the other sheets, through the sheet 302N, are not printed on, and therefore have not been ruined. Once the user has replenished the ink supply of the low or out-of-ink colors, printing can continue with these sheets. In this way, the embodiment of the invention minimizes waste of potentially expensive inkjet paper and ink in multi-pen or multi-cartridge printers as compared to the prior art.

Printer

Figure 4:
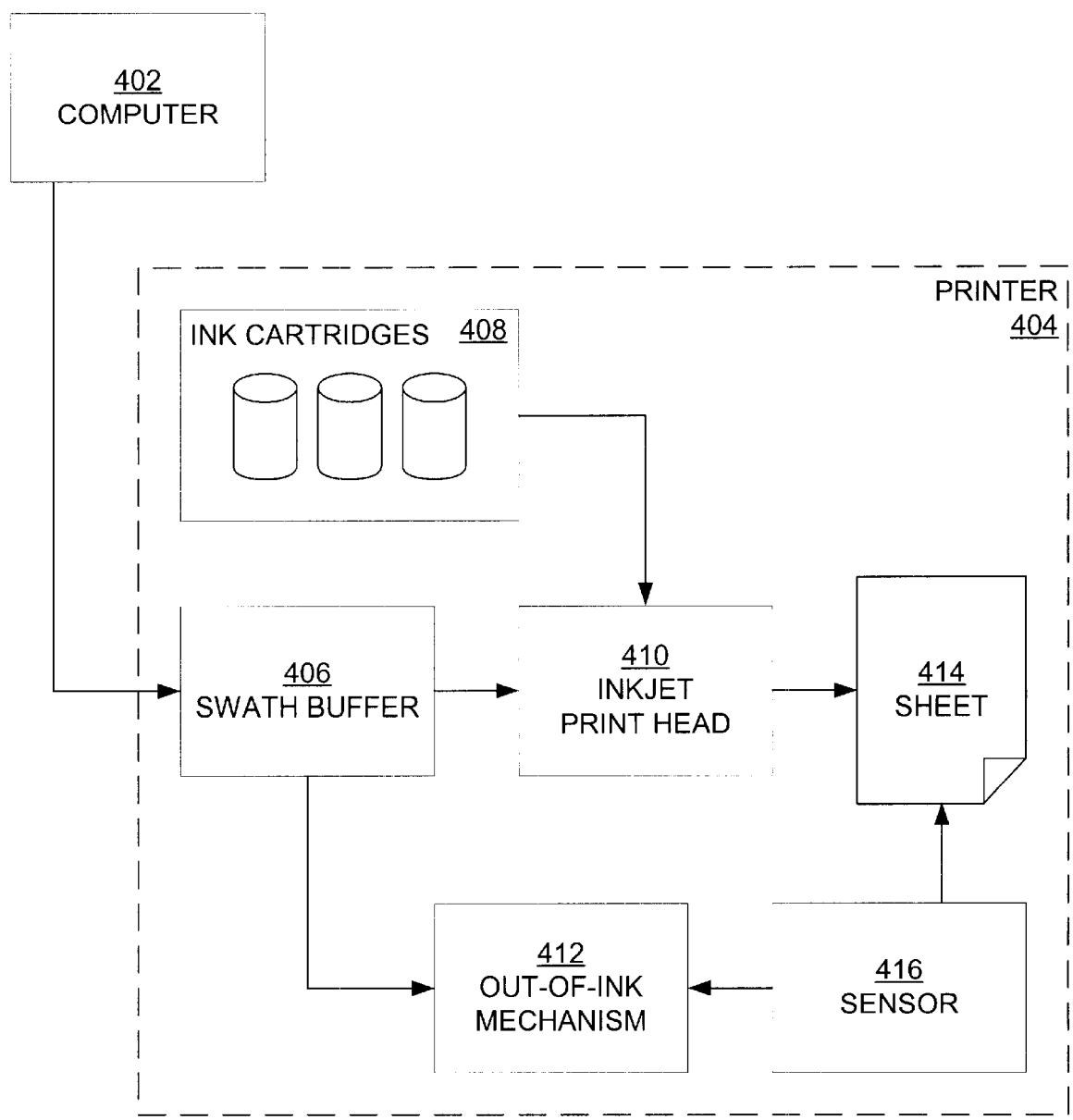
FIG. 4 is a diagram of an embodiment of the invention in which the ink-out verification process is performed at the inkjet printer itself.

FIG. 4 is a block diagram showing an embodiment of a system 400 in which there is a computer 402 communicatively coupled to an inkjet printer 404. The inkjet printer 404 incorporates the described out-of-ink sensing while a sheet 414 is being printed on by the printer 404. Only those components of the printer 404 necessary for the understanding and enablement of this embodiment of the invention are depicted in FIG. 4. As can be appreciated by those of ordinary skill in the art, the printer 404 may have other components not specifically described herein. The printer 404 therefore is shown as including a swath buffer 406, ink cartridges 408, an inkjet print head 410, an out-of-ink mechanism 412, and a sensor 416. A sheet of paper 414 is also indicated as having been inserted into the printer 404.

The computer 402 may be communicatively coupled to the inkjet printer 404 by a wired or a wireless connection. The computer 402 sends information representing an image to be printed by the printer 404. This information may be translated or otherwise modified such that a swath's worth of color information is ultimately generated and stored in the swath buffer 406. The buffer 406 is typically a memory or another type of computer-readable medium. The inkjet print head 410 deposits ink from the ink cartridges 408 onto the sheet 414 in accordance with the swath buffer 406. The ink cartridges 408 may be foam-type cartridges, in which the ink is stored in foam in the cartridges. The color information stored in the swath buffer 406, and ultimately printed on the sheet 414 by the print head 410 using the ink from the cartridges 408, may be RGB color information, LAB color information, CYMK color information or another type of color information.

The out-of-ink mechanism 412 evaluates the buffer color information stored in the swath buffer 406. A sensor 416, which may be a carriage sensor mounted on the carriage of which the inkjet print head 410 may also be a part, measures the printed color information printed by the print head 410 on the sheet 414. The mechanism 412 receives this printed color information from the sensor 416, and compares it to the buffer color information. If the two are substantially equal, this means that the amount of ink predicted to be printed as indicated by the swath buffer 406 is equal to the amount of ink actually deposited by the print head 410 on the sheet 414, such that none of the cartridges 408 have run out of ink.

However, if the two are less than substantially equal, this means that the amount of ink predicted to be printed as indicated by the buffer 406 is greater than the amount of ink actually deposited on the sheet 414, such that one or more of the cartridges 408 have run low on ink. In response to this condition, the out-of-ink mechanism 412 performs one or more out-of-ink actions, such as notifying the user, and aborting printing. The mechanism 412 itself may be a memory or other computer-readable medium, on which instructions are stored for execution by a processor (not shown in FIG. 4) to perform the described functionality of the mechanism 412.

Computer

Figure 5:
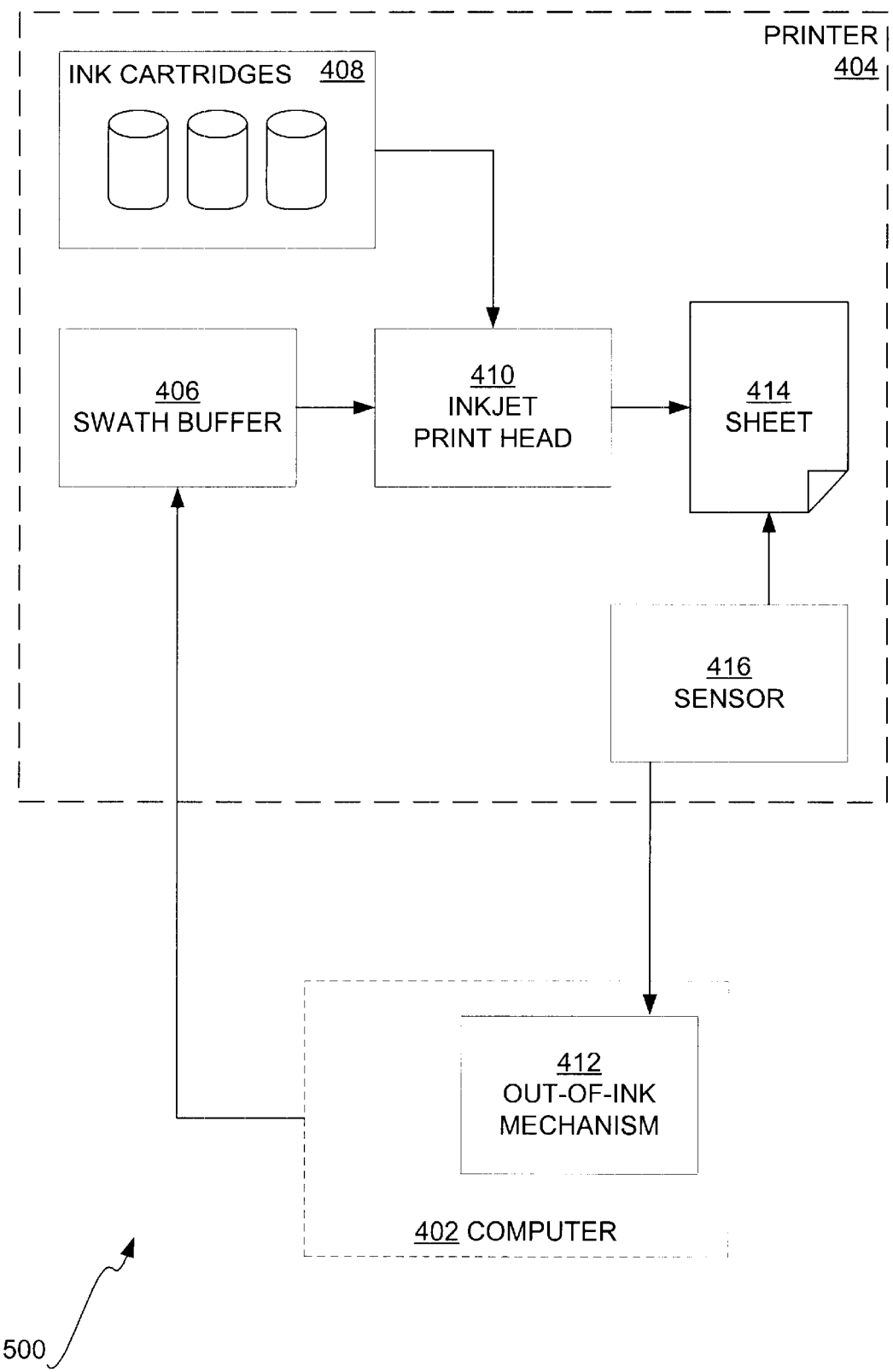
FIG. 5 is a diagram of an embodiment of the invention in which the ink-out verification process is performed at a computer communicatively connected to the inkjet printer.

FIG. 5 is a block diagram showing an alternative embodiment of a system 500 in which the computer 402 performs the described out-of-ink sensing while a sheet 414 is being printed on by the inkjet printer 404. This is in comparison to the system 400 of the embodiment of FIG. 4, in which the printer 404 performs the described out-of-ink sensing while a sheet 414 is being printed on by the printer 404. Thus, the computer 402 incorporates the out-of-ink mechanism 412 in the system 500 of FIG. 5. Otherwise, the operation of the system 500 is similar to that of the system 400 of FIG. 4 as has been described.

The computer 402 sends information representing an image to be printed by the printer 404, such that a swath's worth of color information is ultimately generated and stored in the swath buffer 406. The inkjet print head 410 deposits ink from the ink cartridges 408 in accordance with the buffer 406 onto the sheet 414. The out-of-ink mechanism 412 evaluates the buffer color information stored in the buffer 406, and receives measured printed color information from the sensor 416. If the two are substantially equal, printing continues. Otherwise, an out-of-ink condition has been detected, and the mechanism 412 stops printing, notifies the user, and/or performs other out-of-ink actions.

It is noted that, although specific embodiments have been illustrated and described herein, it will be appreciated by those of ordinary skill in the art that any arrangement is calculated to achieve the same purpose may be substituted for the specific embodiments shown. For example, other applications and uses of embodiments of the invention, besides those described herein, are amenable to at least some embodiments. As an example, the invention can apply to any printing technology that uses primary dyes or pigments to create secondary colors. This application is intended to cover any adaptations or variations of the present invention. Therefore, it is manifestly intended that this invention be limited only by the claims and equivalents thereof.

We claim:

1. A method comprising:
   during printing on a sheet by an inkjet printer, performing at least once:
   evaluating buffer color information for a swath to be printed next on the sheet by the inkjet printer;
   measuring printed color information for the swath as the swath is printed on the sheet by the inkjet printer; and,
   in response to determining that the printed color information is less than substantially equal to the buffer color information, performing one or more out-of-ink actions.

2. The method of claim 1, wherein the evaluating and the measuring are performed for each of a plurality of swaths printed on the sheet by the inkjet printer.

3. The method of claim 1, wherein the evaluating and the measuring are performed for each of less than all of a plurality of swaths printed on the sheet by the inkjet printer.

4. The method of claim 1, wherein evaluating the buffer color information for the swath comprises determining a buffer amount of each of one or more ink colors to be printed next on the sheet by the inkjet printer.

5. The method of claim 4, wherein measuring the printer color information for the swath comprises determining an actual amount of each of the one or more ink colors printed on the sheet by the inkjet printer.

6. The method of claim 5, wherein determining that the printed color information is less than substantially equal to the buffer color information comprises determining that, for any of the one or more ink colors, the actual amount of the ink color as printed on the sheet by the inkjet printer is less than substantially equal to the buffer amount of the ink color.

7. The method of claim 1, wherein determining that the printed color information is less than substantially equal to the buffer color information comprises determining that the printed color information minus the buffer color information absolutely is less than a threshold.

8. The method of claim 1, wherein measuring the printed color information as printed on the sheet by the inkjet printer comprises using a carriage sensor to measure the printed color information.

9. The method of claim 1, wherein the one or more out-of-ink actions comprises one or more of: stopping printing; and, alerting a user.

10. A printer comprising:
    one or more sources of ink;
    an inkjet print head to print ink from the one or more sources of ink on a sheet;
    a swath buffer to store buffer color information for a swath to be printed next on the sheet by the inkjet print head;
    a sensor to determine printed color information for the swath as printed on the sheet by the inkjet print head; and,
    a out-of-ink mechanism to perform one or more out-of-ink actions in response to determining that the printed color information is less than substantially equal to the buffer color information.

11. The printer of claim 10, wherein the one or more sources of ink each comprise foam to store the ink.

12. The printer of claim 10, wherein the swath buffer comprises a computer-readable medium.

13. The printer of claim 10, wherein the sensor comprises a carriage sensor.

14. The printer of claim 10, wherein the out-of-ink mechanism comprises a computer-readable medium having instructions stored thereon for execution by a processor to perform the one or more out-of-ink actions in response to determining that the printed color information is less than substantially equal to the buffer color information.

15. The printer of claim 10, wherein the buffer color information and the printed color information comprise one of: RGB color information, LAB color information, and CYMK color information.

16. A computer-readable medium having instructions stored thereon for execution by a processor to perform a method comprising, during printing on a sheet by a printer, performing at least once:
    determining a buffer amount of each of one or more colors to be printed next on a sheet by the printer;
    determining an actual amount of each of the one or more colors printed on the sheet by the printer; and,
    in response to determining that, for any of the one or more colors, the actual amount of the color as printed on the sheet by the printer is less than substantially equal to the buffer amount of the color, performing one or more actions.

17. The medium of claim 16, wherein the medium and the processor are part of the printer.

18. The medium of claim 16, wherein the medium and the processor are part of a computer communicatively connected to the printer.

19. The medium of claim 16, wherein the determining the buffer amount and the determining the actual amount of each of the one or more colors are performed for each of at least some of a plurality of image parts printed on the sheet by the printer.

20. The medium of claim 16, wherein the one or more colors each essentially consists of one of an ink, a dye, and a pigment.

* * * * *